Sept. 25, 1928. 1,685,103
M. TAIGMAN
MOTOR STAND
Filed Feb. 9, 1923 2 Sheets-Sheet 1
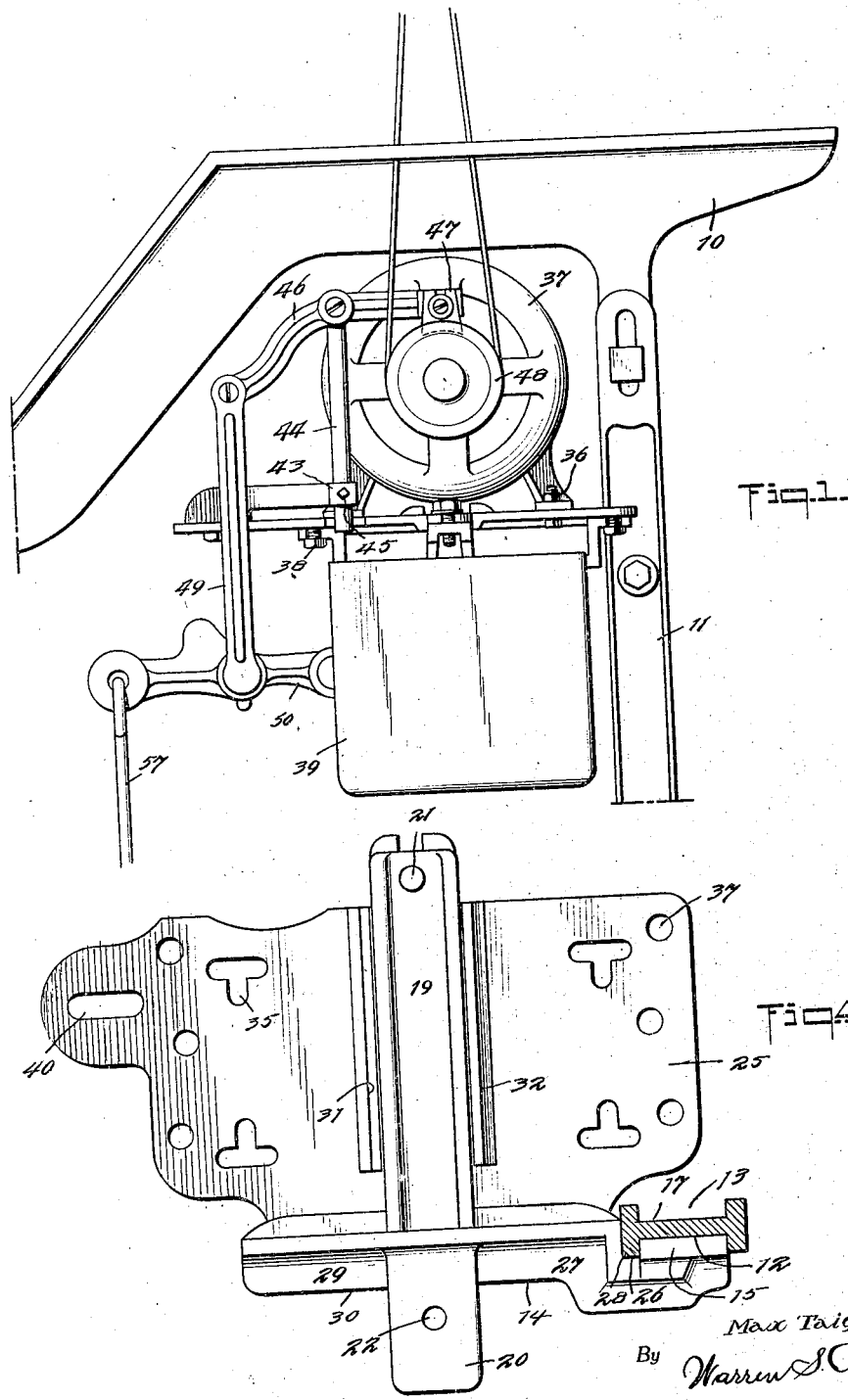
Inventor
*Max Taigman*
By *Warren S. Orton*
Attorney Sept. 25, 1928.                M. TAIGMAN                1,685,103
                              MOTOR STAND
                           Filed Feb. 9, 1923         2 Sheets-Sheet 2
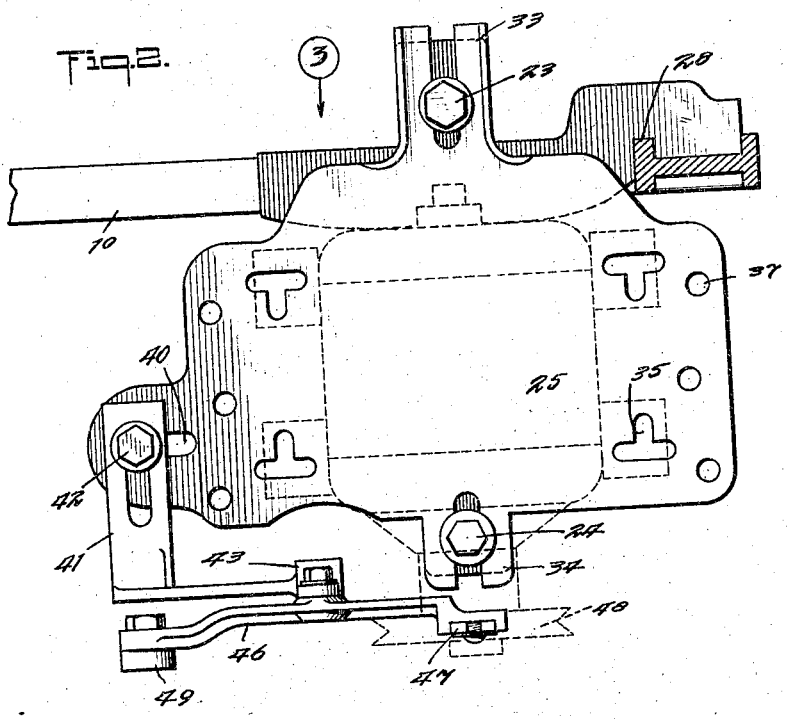
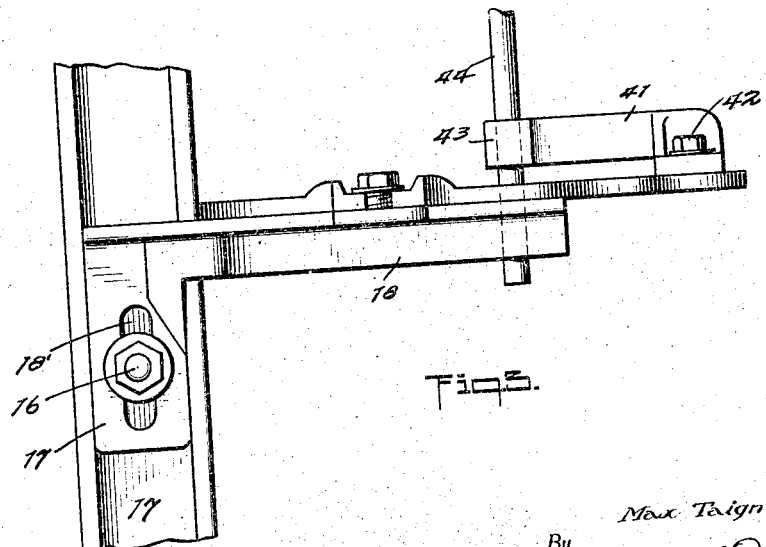

Patented Sept. 25, 1928.

1,685,103

UNITED STATES PATENT OFFICE.

MAX TAIGMAN, OF NEW YORK, N. Y.

MOTOR STAND.

Application filed February 9, 1923. Serial No. 617,964.

The invention relates in general to an electric motor driving unit for installation on sewing machines and the like, and which unit usually includes an electric motor, a starting box therefor, and a mounting for the same which comprises a base plate secured in adjusted position to the machine standards or other upright by means of a bracket. The invention herein disclosed specifically relates to an improved form of such mounting means and particularly to the bracket for supporting the base plate.

It is required in the commercial production of mountings of the type herein disclosed that the parts be made as light as possible so as to economize in cost of production, but at the same time it is required that the mountings possess sufficient rigidity to withstand strains incidental to the use of a relatively heavy motor and starter box mounted thereon or suspended therefrom. In similar constructions now known, it has been possible to support the motor mounting plate at two or more points, one of which is usually the channelled shaped upright which supports the work table carrying the sewing machine. In some constructions of work table frames it is not convenient to provide for this plurality of supports for the mounting plate and usually the channel shaped upright provides practically the only available place from which to support the motor in the available space therefore beneath the work table.

Taking into consideration the peculiar limitations presented to any freedom of choice in mounting the unit, the primary object of the present disclosure is to provide a simplified form of motor support designed to securely locate the motor, and its starting box, in the available space adjacent to the channelled shaped upright constituting part of a present form of table frame and to support the motor in such way that the strain of its weight is distributed to avoid distortional stresses, to minimize the transference of vibration from the motor to the table frame and to attain these results with the use of a relatively small amount of material. At the same time it is intended to provide a standard form of mounting which can be readily adjusted to accommodate motors of different size and shape and which will facilitate the ready locating of the motor with relation to the machine on the table top which machine the motor is intended to drive.

Specifically the invention features a form of one-piece bracket which will constitute the sole support for the base plate, which will be characterized by extreme rigidity when secured to the channel shaped upright and which will permit the easy adjustment of the plate mounted thereon simply by loosening two bolts which can be tightened up after the plate is adjusted and thus act to secure the plate and bracket in such relation that one will tend to reinforce the other. Still another object of the invention is to provide a support for the motor and its starting box which may be disposed in such relation to the assembled bracket and plate that the strains thereon will be balanced and in this way permit the utilization of all of the material as a strain resistant element.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a view in front elevation of a preferred embodiment of the invention mounted in position on the frame of a work table a part of which is shown in the drawings;

Figure 2 is a plan view looking down upon the construction shown in Figure 1, with the table frame shown in section and with the motor shown in dotted outline.

Figure 3 is an elevational view looking at the part shown in Figure 2 from the upper side thereof as indicated by the arrow numbered 3; and Figure 4 is a plan view of the underside of the structure shown in the preceding figures with the starter box removed and the upright shown in cross section.

In the following description and in the claims, parts will be identified by specific names for convenience of expression but they are intended to be as generic in their application to similar parts as the art will permit.

In the drawings there is shown a work table 10 supported from a frame, one of the uprights 11 of which is shown to be of conventional channel shaped form and in the trough portions 12 (or 13) of which is designed to be mounted a bracket 14 depending upon whether it is desired to extend the bracket to the left or to the right of the upright. The bracket 14 is a single, one-piece relatively heavy casting which includes a vertically disposed pedestal piece 15 having a configuration to fit within the trough of the upright and secured to the upright by bolt 16 passing through the pedestal piece and through the web 17 of the channel shaped upright. Preferably the pedestal piece includes a vertically extending slot 18′ through which the bolt is passed and this construction provides for a vertical adjustment of the pedestal within the limits of the length of the slot. The pedestal piece has a horizontally disposed extension 18 practically in the form of a Maltese cross and one arm of which is in the form of a long flat bar 19 extending at right angles to the plane of the web 17. The oppositely disposed arms 19 and 20 of the cross are provided with screw holes 21 and 22 to accommodate bolts 23 and 24 for securing the base plate 25 hereinafter more fully described. A slot 26 is formed between the pedestal piece and the adjacent bracket arm 27 which slot is designed to receive the adjacent flange 28 of the channel shaped upright and in this way any tendency of the bracket to turn on the upright is resisted by the engagement of the horizontal extension or of the pedestal piece with the flange depending upon the direction in which the relative movement between the upright and bracket manifests its tendency to move. The arm 27 and its oppositely disposed arm 29 are provided with depending webs 30 which gives this portion of the bracket a form T-shaped in cross-section extending in the direction of the web 17 of the upright.

The base plate 25 is made as thin as is possible and at the same time to prevent any tendency to distort under the weight of the motor and its starting box, the plate is provided on its underside with a pair of parallelly extending guiding flanges 31 and 32 which coact to provide a guide-way in which is positioned the long flat bar 19 of the bracket when the plate is disposed in position resting on the bracket. The plate is provided on opposite sides with a pair of outwardly projecting slotted extensions 33 and 34 which receive the bolts 23 and 24. It is understood that by this construction the bolts can be loosened, the plate adjusted in the direction of the length of the flat bar after which the bolts may be tightened in position, thus securing the plate to the bracket so that thereafter they will act practically as one piece. The flat bar of the bracket acts as a deep rigid web for reinforcing the center of the plate below the motor.

The plate is provided with a plurality of T-slots 35 spaced apart at opposite sides of the flat bar 19 and through which are passed the bolts 36 for securing the motor 37 in position approximately centered on top of the plate 25. The plate is also provided with screw holes 37 which receive the bolts 38 from which is suspended the starting box 39 for controlling the motor.

The plate 25 also contains an elongated slot 40 for mounting the brake and control lever mechanism. This mechanism includes a bracket arm 41 secured to the slot 40 by the bolt and slot connection 42 and which bracket contains at its free end a sleeve 43 in which is adjustably positioned a brake supporting rod 44 secured in position by means of a jam nut 45. The rod 44 has pivoted thereto the brake lever 46 at one end of which is secured the brake 47 for engaging the pulley 48 of the motor 37. The opposite end of the lever 46 is provided with a link 49 to the lower end of which is pivoted a control lever 50 for controlling the speed of the motor by shifting across contacts in the starter box 39. The opposite end of the lever 50 is provided with a treadle rod 51 leading to the foot treadle as is usual in constructions of this character.

In operation it will be understood that the bracket with its plate in position thereon is equipped with the proper size of motor and its starting box and with the proper form of brake and control mechanism. The unit thus assembled is carried to the stand on which it is intended to be mounted and the channel upright drilled if necessary to provide the hole for the securing bolt 16. In mounting the units at the factory extreme care is exercised to position the motor and its starting box in balanced position relative to the flat bar on the bracket and this preset position is maintained in so far as is possible. However, it frequently occurs that the position of the sewing machine on top of the table necessitates some slight readjustment of the preset arrangement of the parts but any such readjustment is maintained to its least possible displacement from the preset arrangement.

By means of a device of the class outlined it is possible to support the heavy motor and controller box usual in such constructions from the single channelled upright of the table frame. All necessary adjustment is provided and the parts while featuring lightness in weight have their metal so disposed that distortion is eliminated and sufficient rigidity is provided to minimize bending of the parts or forming of local vibration due to the action of the offset motor.

The motor is disposed in the available space beneath the table, near but offset from the supporting upright and in proper position relative to the operator.

All parts are readily accessible for adjustment, if such adjustment becomes necessary due to the wear of the brakes or other parts, and either the motor or its starting box can be readily replaced with another similar part without necessity of disorganizing any more of the structure than is necessary to effect the replacement.

Having thus described my invention, I claim:

1. In an electric motor supporting unit, the combination of two elements, one element constituting a bracket provided with a vertically extending pedestal piece adapted to fit in the trough of a channel shaped upright and a horizontally extending plate support including a long flat bar, offset from said pedestal piece, said pedestal piece and said plate support coacting to provide a slot therebetween for receiving one of the flanges of the upright and adapted to coact therewith to minimize the tendency of the bracket to turn on the supporting upright, a mechanism supporting plate positioned on said support, adjustable in the direction of the length of said bar and provided on its underside and adjacent its center with a pair of guides for receiving therebetween the long bar, supporting the plate adjacent the center thereof, said plate provided on opposite sides of the bar with means for securing thereto a motor and its starting box, and means for securing the plate to the bracket in adjusted position relative to the upright thereby to locate the motor and the starting box in set position relative to the upright.

2. In a device of the class described, the combination of a base plate, a bracket for supporting the same, said bracket including a vertically disposed pedestal piece and a horizontally disposed extension integrally connected, said extension being substantially T-shaped in vertical cross-section to form a flat support for the plate and a deep vertically extending web, said pedestal piece and said extension coacting to form a slot therebetween adapted to receive a flange of a channel shaped supporting upright.

Signed at New York city, in the county of New York and State of New York, this 4th day of February, A. D. 1923.

MAX TAIGMAN.